United States Patent
Ksieski

[15] 3,645,543
[45] Feb. 29, 1972

[54] SHAFT PACKING ASSEMBLY
[72] Inventor: Kazimierz T. Ksieski, Inglewood, Calif.
[73] Assignee: Parker-Hannifin Corporation, Cleveland, Ohio
[22] Filed: Aug. 14, 1970
[21] Appl. No.: 63,678

[52] U.S. Cl............................................227/58, 277/188
[51] Int. Cl.......................................................F16j 15/32
[58] Field of Search....................277/58, 188, 176, 177, 125

[56] References Cited
UNITED STATES PATENTS
2,509,436  5/1950  Isenbarger............................277/188
2,862,736  12/1958  Russell..............................277/188 X
2,905,489  9/1959  Thompson et al. ................277/188 X Primary Examiner—Herbert F. Ross
Assistant Examiner—Robert I. Smith
Attorney—Diller, Brown, Ramik & Holt

[57] ABSTRACT

This disclosure relates to a packing capable of accommodating limited transverse relative movement of a shaft and housing sealed thereby. The packing includes a combination of backup rings which prevent seal extrusion between the shaft and the housing while permitting the transverse movement.

9 Claims, 4 Drawing Figures

Patented Feb. 29, 1972 3,645,543
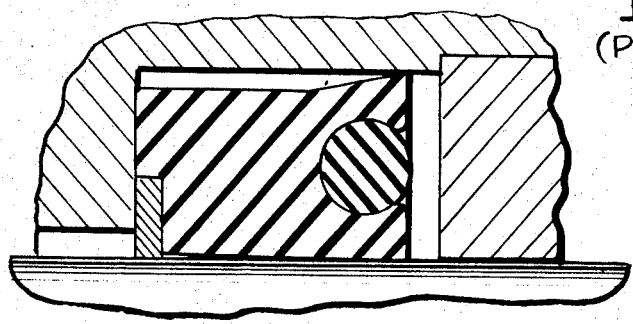
FIG.4
(PRIOR ART)
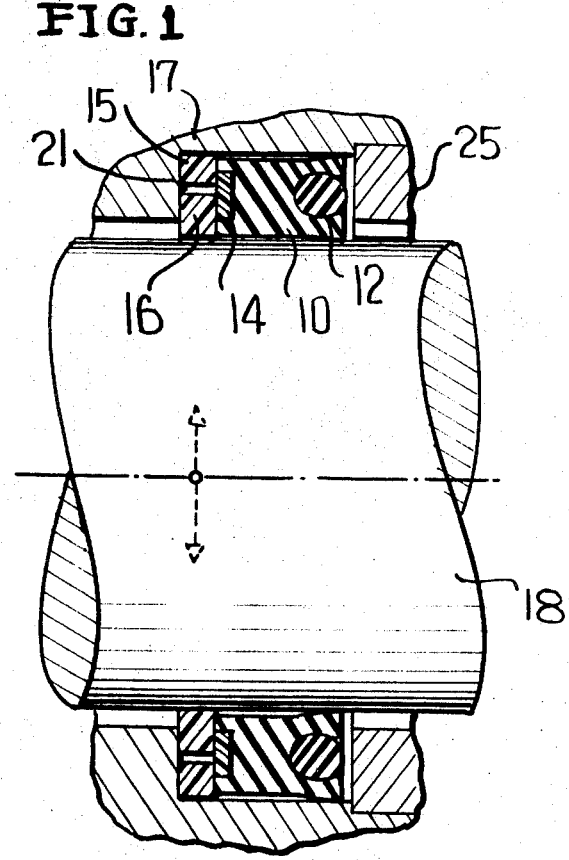
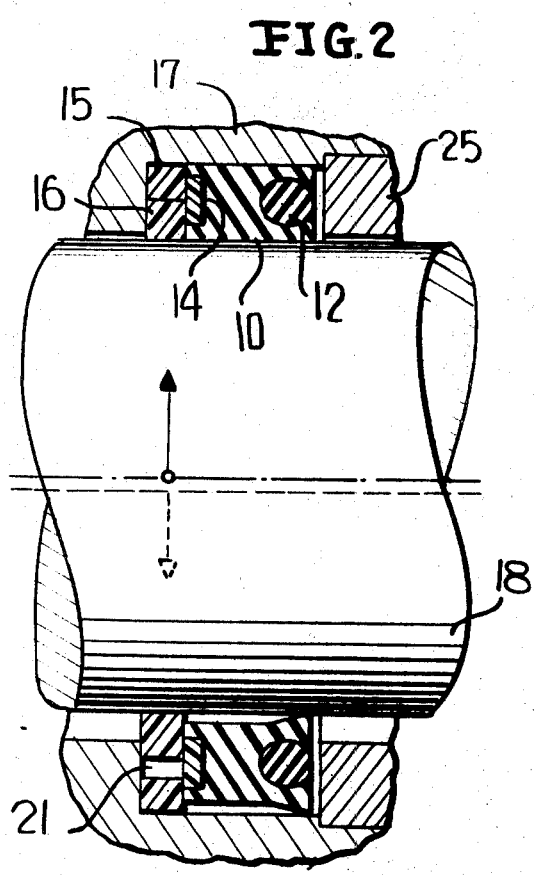
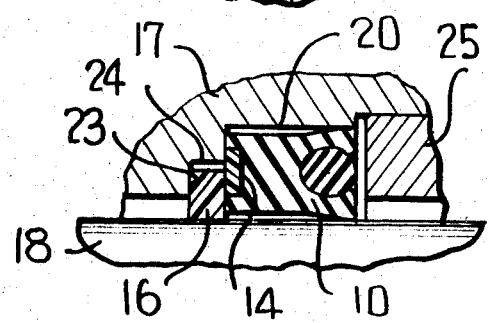
INVENTOR
KAZIMIERZ T. KSIESKI
By Dilee, Brown, Ramik & Holt
ATTORNEYS

SHAFT PACKING ASSEMBLY

BACKGROUND OF THE INVENTION

Backup rings have been heretofore used for preventing packing extrusion axially of a shaft into the clearance space between the shaft and the housing. Such rings are of a relatively rigid construction, being formed of a rigid plastic, and cannot closely fit both shaft and housing and still allow either axial misalignment or relative transverse movement between the shaft and housing. One such prior arrangement, as shown in FIG. 4 employs a narrow backup ring that closely fits the shaft to prevent axial extrusion of the packing and has a large clearance between its outer diameter and the housing ostensibly to permit transverse movement between the shaft and housing, but such transverse movement is inhibited by the packing material in such clearance, either initially as shown in FIG. 4, or as the result of deformation of the packing by fluid pressure.

BRIEF DESCRIPTION OF THE INVENTION

The deficiencies of prior backup arrangements are overcome by providing a backup ring system in which the resilient packing material is prevented from interfering with radial movement of the rigid backup ring relative to either the shaft or housing.

The specific details of the invention will be more apparent from the following description and drawing wherein:

FIG. 1 is a sectional view of the packing system with the shaft centered in the housing.

FIG. 2 is a sectional view similar to FIG. 1 with the shaft misaligned relative to the housing.

FIG. 3 is a fragmentary sectional view similar to FIG. 1 showing a modified backup ring system.

FIG. 4 is a sectional view of a prior packing arrangement.

DETAIL DESCRIPTION

A packing system of the form shown in FIGS. 1 and 2 includes a V-type packing 10 of resilient material having in one end groove 11 for an expander ring 12 and a groove 13 in its other end for an intermediate backup ring 14. There is also an outer backup ring 15 having a close fit at its O.D. with housing 17 and an inner backup ring 16 having a close fit on shaft 18. Ring 14 may be bonded within groove 13 if desired and all three backup rings are of relatively rigid material, such as plastic or metal.

When shaft 18 is centered within bore 19 of the housing, a uniform annular gap 21 exists between rings 15, 16 that is of substantial radial dimension but which is preferably smaller than the radial clearance between the shaft and housing bore 19. In addition, when the shaft is centered, the radial dimension of gap 25 and the slight clearances between the shaft and ring 16 and between the housing and ring 15 are slightly less in total than clearance 26 whereby when the shaft is radially displaced relative to the housing the clearances for the backup rings 16, 17 will be taken up and the resulting contact between rings 15 and 16 with each other and respectively with the housing and shaft will prevent the shaft from contacting bore 19.

Packing 10 is floatingly mounted in housing recess 20 with appreciable radial clearances between its main body portion and both the housing and shaft but with its lips 21, 22 respectively spread into sealing engagement with the housing and shaft by expanding ring 12. Ring 14 abuts rings 15, 16 bridging gap 25 and preventing extrusion of packing 10 thereto. The close radial clearance between housing 17 and ring 15 prevents axial extrusion of packing 10 between these members and the close radial clearance between shaft 10 and ring 16 prevents axial extrusion of packing 10 between those members.

When shaft 18 is misaligned with bore 19 of housing 17 (FIG. 2) ring 16 has shifted radially with shaft 18 to take up clearance 26 on one side and enlarging it on the other while rings 15 and 16 prevent packing extrusion along the housing and shaft and ring 14 continues to bridge gap 25 to prevent extrusion of the packing thereinto. Meanwhile lips 21, 22 maintain sealing contact with the housing and shaft. Thus, there is no extrusion of resilient material from packing 10 between radially opposite surfaces of the backup rings 15, 16 and the housing and shaft to inhibit misaligning movement between the shaft and housing. Moreover, because rings 14, 15 and 16, and the housing are of relatively hard material there will be little friction therebetween for resisting radial movement of one upon the other.

In the form of the invention shown in FIG. 3 the outer backup ring 15 of FIG. 2 is made integral with housing 17 at 27 to form a second recess 23 in the housing for receiving ring 16. Recess 23 has the same axial dimension as ring 16 and its diameter corresponds with the I.D. of ring 15 to allow radial shifting of ring 16 during misalignment of shaft 18. Gap 24 between ring 16 and housing 17 will be bridged by ring 14 in all radial positions of shaft 18.

What is claimed as new:

1. A backup ring system for use with a packing to seal a shaft relative to a housing in which the shaft is received, said backup ring system comprising concentric inner and outer rings having a radial gap therebetween and radially located between the shaft and housing and axially opposite the packing, said inner ring being radially displaceable relative to the housing, and an intermediate ring axially between the packing and said inner and outer rings and in face-to-face contact with said inner and outer rings and bridging said gap.

2. The system of claim 1 wherein said inner ring has a close fit on the rod to prevent extrusion of the packing therebetween.

3. The system of claim 1 wherein said outer ring has a close fit at its outside diameter with said housing to prevent extrusion of said packing therebetween.

4. The system of claim 1 wherein said outer ring is an integral part of the housing.

5. The backup system of claim 1 wherein said third ring is mounted within a groove in the packing.

6. The backup ring system of claim 1 wherein said rings are of material more rigid than the packing.

7. The system of claim 1 in which there is a radial clearance between the shaft and housing that is larger when the shaft is centered in the housing than the total of the radial clearances between the shaft and inner ring, the housing and outer ring, and the clearance constituting said gap.

8. The system of claim 1 in which when the shaft is centered in the housing the clearance between the shaft and inner ring is less than the radial width of said gap.

9. The system of claim 1 in which when the shaft is centered in said housing the clearance between the housing and outer ring is less than the radial width of the gap.

* * * * *